United States Patent
Kulakowski

(10) Patent No.: US 10,897,711 B2
(45) Date of Patent: Jan. 19, 2021

(54) METHOD AND A SERVER FOR AUTHENTICATING A USER WITH A MOBILE DEVICE

(71) Applicant: PHONE ID SP. Z O.O., Warsaw (PL)

(72) Inventor: Henryk Kulakowski, Wola Prażmowska (PL)

(73) Assignee: PHONE ID SP. Z O.O., Warsaw (PL)

( * ) Notice: Subject to any disclaimer, the term of this patent is extended or adjusted under 35 U.S.C. 154(b) by 113 days.

(21) Appl. No.: 16/081,684

(22) PCT Filed: Mar. 1, 2017

(86) PCT No.: PCT/PL2017/000017
§ 371 (c)(1),
(2) Date: Aug. 31, 2018

(87) PCT Pub. No.: WO2017/150996
PCT Pub. Date: Sep. 8, 2017

(65) Prior Publication Data
US 2019/0075458 A1   Mar. 7, 2019

(30) Foreign Application Priority Data
Mar. 1, 2016   (PL) .......................... 416364

(51) Int. Cl.
*H04W 12/06* (2009.01)
*G06F 21/31* (2013.01)
(Continued)

(52) U.S. Cl.
CPC .......... *H04W 12/06* (2013.01); *G06F 21/313* (2013.01); *G06F 21/42* (2013.01); *H04L 63/08* (2013.01);
(Continued)

(58) Field of Classification Search
CPC ..... H04L 63/18; H04L 63/08; H04L 63/0876; H04L 63/0861; H04W 12/06; H04W 12/08; G06F 21/42; G06F 21/313
See application file for complete search history.

(56) References Cited

U.S. PATENT DOCUMENTS 8,151,344 B1   4/2012   Channakeshava
8,676,745 B2 *  3/2014  Papili ............... H04W 8/245
                                                707/601
(Continued)

FOREIGN PATENT DOCUMENTS

EP    1305926 B1   12/2008
KR    101474144 B1   12/2014

OTHER PUBLICATIONS

International Search Report & Written Opinion of the International Searching Authority dated Aug. 14, 2017, issued in International Application No. PCT/PL/000017.

*Primary Examiner* — Joseph P Hirl
*Assistant Examiner* — Thomas A Gyorfi
(74) *Attorney, Agent, or Firm* — Andrew M. Calderon; Roberts Calderon Safran & Cole, P.C.

(57) ABSTRACT

The present invention relates to a method for authenticating a user for services, by means of a mobile phone, comprising: receiving, by a server from a service, a request to authenticate a user, assigning an unique access number by the server, presenting the access number from the server to the user via the service, receiving, by the server by means of a terminal device that services the access number, information about a call performed by the user to the access number, the information containing at least the access number and the user's MSISDN, performing, by the server, a basic authentication of the user, comprising at least reading the user's MSISDN and the access number, transferring the result of the basic authentication from the server to the service. The (Continued)

invention also relates to a system authenticating a user, USER, by means of a mobile device.

19 Claims, 4 Drawing Sheets

(51) Int. Cl.
  *G06F 21/42* (2013.01)
  *H04L 29/06* (2006.01)
(52) U.S. Cl.
  CPC ...... *H04L 63/0861* (2013.01); *H04L 63/0876* (2013.01); *H04L 63/18* (2013.01)

(56) References Cited

U.S. PATENT DOCUMENTS

| | | | |
|---|---|---|---|
| 2003/0128822 A1* | 7/2003 | Leivo | G06F 21/42 379/93.02 |
| 2009/0037982 A1* | 2/2009 | Wentker | H04L 63/083 726/3 |
| 2013/0324083 A1 | 12/2013 | Celi, Jr. et al. | |
| 2016/0205557 A1* | 7/2016 | Tuupola | H04L 63/107 455/411 |
| 2017/0180136 A1* | 6/2017 | Ibasco | H04L 63/0428 |

\* cited by examiner

METHOD AND A SERVER FOR AUTHENTICATING A USER WITH A MOBILE DEVICE

FIELD OF THE INVENTION

This invention relates to a method and a server for authenticating a user with a mobile device, for example a mobile phone, without having to install additional applications or employing any data transmission. Such an authentication may be used for verifying an access to web sites, authorizing bank operations, or performing a citizen's digital identifier.

BACKGROUND

One knows various methods for authenticating users by means of cellular phones. The most common solution is based on verifying the MSISDN (Mobile Station International Subscriber Directory Number) number of a calling mobile phone that allows the receiving party to check who is initiating the call (so called CLIP, Calling Line Identification Presentation). It is a commonly used solution, for example for identifying users in various sorts of call centers or even in feature mobile phones. When a user is calling a call center, his/her phone number is identified, and, optionally, the user may be asked to enter a PIN code, for example. Although this solution is very popular and standardized by ITU (International Telecommunication Union), its use, however, is quiet limited—it is used merely for phone communication with a user.

For authenticating a user by means of a web site or a software application in a mobile device, one knows another solution that allows for authentication of a user by means of single-use SMS codes. A user enters, on a web site or in a software application, his/her mobile phone number to which a code or a password is to be sent that the user has to re-enter again on the web site or in the software application. This solution makes it possible to verify the user's phone number as well as the fact that he/she is owner of the phone number, because he/she has received the code in the SMS message and rewritten it again on the web site or in the software application. It is a more and more frequently used procedure, mainly in the field of finance services.

Yet another solution is to authenticate a user by means of personalized web addresses (links), frequently presented as 2D codes. Two relevant methods may be mentioned. In the first one, a personalized hyperlink is sent via an SMS to user's mobile phone, and then the user, by clicking the link, accesses a particular web site, this verifying him/her identity. The core of this solution is the assumption that the link may be activated only by the user who received the SMS, i.e., owns the number. The second method is based on installing a dedicated software application onto the telephone, that single time, by means of the above described technique of authenticating via SMS codes, assigns the software application to a specified telephone number. To authorize himself/herself, for example, at a web site of a service, the user scans the 2D code by means of this application, the code comprising a specific reference or a numerical code, visible in the web page, and then the software application transfers this information along with the user's phone number to a server that performs the authentication of the user and accepts him/her to the contents of the service.

In the above described methods of authenticating, a problem arises that sending the SMS by the service provider generates costs for him (outgoing traffic), and the SMS itself may be delivered to the recipient's phone with some delay, this resulting in a necessity of sending an SMS again with a new code. Also, the necessity of rewriting the obtained code/password from the SMS to the software application is an inconvenience, especially for people with impaired vision, and may be a source of mistakes, especially when using mobile devices with limited navigation functionality and rather small displays. On the other hand, the solutions based on software applications have somewhat bigger capabilities, but also the requirements relative to the user are bigger, namely the necessity of installing a dedicated software application or having an access to the Internet. Additionally, the solutions based on software applications are more prone to hacker attacks (pretending to be the users in software applications in other devices).

In view of the above, the object of the present invention is to provide a versatile and efficient method for authenticating a user by means of a mobile device, employing the basic functionality of the telephone and not requiring any applications or data transmission for performing the present method. This invention guarantees the appropriate authentication even on feature phones and, at the same time, makes it possible to employ the newest technologies available on modern mobile devices, thus providing great versatility, wide accessibility, and backward compatibility.

SUMMARY

According to the invention, the above stated object is reached with features of independent claims 1 and 13 that relate to a method and a server for performing the method, respectively. The present invention in its original scope employs the basic functionality of a telephone, without installing any additional software applications or using data transmission. It does not require to rewrite SMS codes neither, and it is similar, in terms of its functionality, to using Internet hyperlinks.

In a first embodiment of the present invention, a method is provided for authenticating a user for services, by means of a mobile phone, comprising:

Receiving, by a server from a service, a request to authenticate a user,

Assigning an unique access number by the server,

Presenting the access number from the server to the user via the service,

Receiving, by the server by means of a terminal device that services the access number, information about a call performed by the user to the access number, the information containing at least the access number and the user's MSISDN, Performing, by the server, a basic authentication of the user, comprising at least reading the user's MSISDN and the access number, Transferring the result of the basic authentication from the server to the service.

According to the present method, the request received by the server from the service may contain the user's MSISDN. Then, the transfer of result of the basic authentication from the server to the service is performed after the server verifies, within the basic authentication, the MSISDN number indicated by the service. Preferably, after transferring, by the server, the result of the basic authentication to the service, the server may receive a request to perform a complementary authentication of the user, the result of which it sends back to the service. Within the basic or complementary authentication, additionally, identification of the user may be performed basing on his/her individual user's profile comprising at least one of: biometric features, an alphanumeric password, a numeric code, or a digital identifier. The individual user profile is transferred from the user's mobile device to the server by means of one of: tone dialing DTMF, an SMS message, a USSD message, speech recognition, electromagnetic waves, graphical message, or a video message. Preferably, in the case of the above described authentication, the server sends to the user additional information authenticating the server itself. The authentication described above may be performed also on the user's mobile device. Preferably, along with transferring the result of the authentication of the user from the server to the service, also the call incoming from the user's mobile device to the server is forwarded to the service. The reception, by the server, of the information containing the access number and the user's MSISDN number, may be performed also by means of the TCP/IP network directly from the user's phone. The access number may be presented in the form of digits, graphical codes or electromagnetic codes. Also, the access number may be a number from outside the commonly available numbering range in a public communications network. Preferably, the request to authenticate the user received by the server contains also information about the form of the access number, and the access number is assigned by the server taking this information into consideration.

According to a second embodiment of the present invention, a server is provided for authenticating a user by means of a mobile device, comprising:
A terminal device making it possible to receive communications calls,
A microprocessor system enabling to activate a software application, to process data and to communicate with the terminal device and a TCP/IP network interface,
A TCP/IP network interface,
A database for storing and processing information about access numbers, users' MSISDN numbers, their individual profiles, and configuration and profiles of services,
A server application enabling to exchange information with the service and the user's mobile device,
A memory for storing the database, the server application, and for processing data, the microprocessor system, while executing the server application, being adapted for:
  Receiving, by the server from the service, a request to authenticate a user,
  Assigning, by the server, an access number,
  Presenting, by the server, the access number to the user via the service,
  Receiving, by the server by means of the terminal device that services the access number, information about the call performed by the user to the access number, the information containing at least the access number and the user's MSISDN,
  Performing a basic authentication of the user, comprising at least reading the user's MSISDN and the access number,
  Transferring the result of the basic authentication from the server to the service.
In the server, the microprocessor system, while executing the server application, is adapted for performing, in cooperation with the mobile device, a complementary authentication of the user and transferring the result of this authentication to the service. Preferably, the microprocessor system, while performing the authentication procedure, is adapted for identifying the user basing on his/her individual user's profile. An individual profile may be a biometric feature, an alphanumeric password, a PIN code, or a digital identifier. Preferably, the terminal device makes it possible to state contact points with mobile telephony networks.

BRIEF DESCRIPTION OF THE DRAWINGS

Embodiments of the invention will be described with reference to drawings, in which.

DETAILED DESCRIPTION

In the following description exemplary embodiments are presented of a method and a server for authenticating a user by means of a mobile device. Examples illustrate the use of the invention for authorizing an access to web pages, authorizing financial transactions, or identifying an applicant contacting an office. It should be noted, however, that the following examples are not to limit the protection scope of the invention, and are given merely to illustrate several of many possible applications of the present invention. The present invention finds application where an authentication of a user is needed and the user is using a mobile device.

Figure 1:
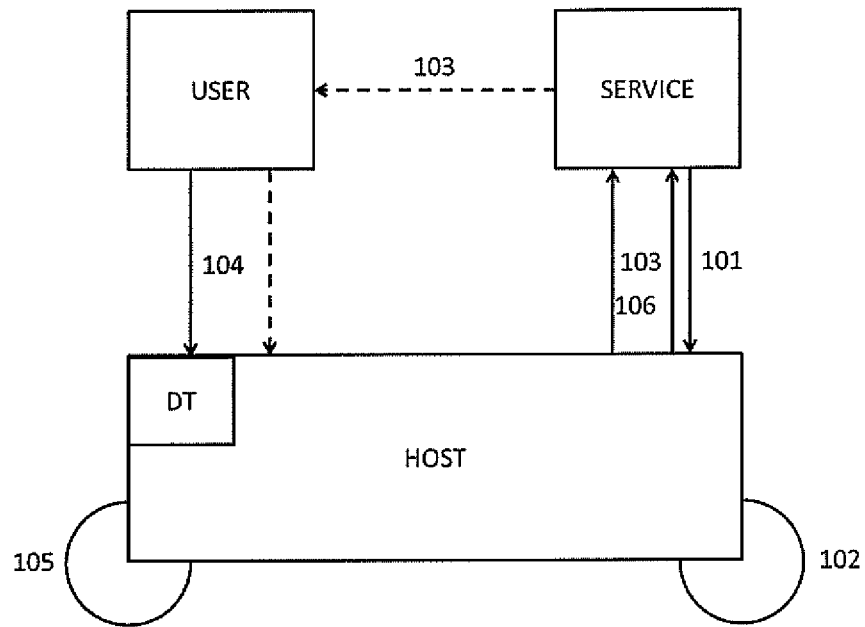
FIG. 1 illustrates a method for authenticating, in a first embodiment.
Figure 4:
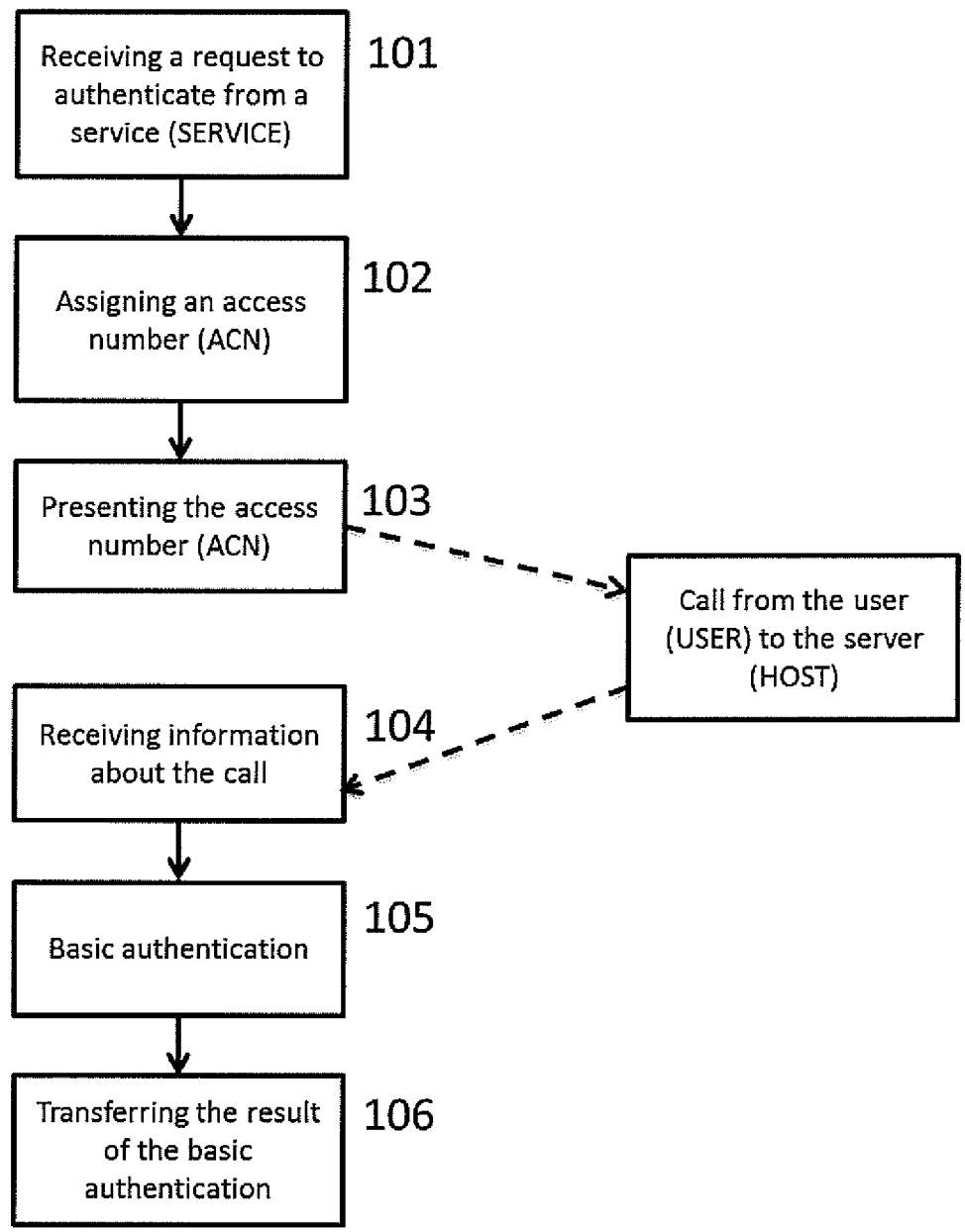
FIG. 4 illustrates a method for authenticating, in a first embodiment.

According to the present invention, illustrated in FIGS. 1 and 4, a server, HOST, receives, 101, from a service, SERVICE, a request to authenticate a user, USER.

Preferably, this request may contain an expected MSISDN number of the user, USER. The server, HOST, assigns, 102, to this request, an access number, ACN, that, subsequently, is presented, 103, to the user, USER, via the service, SERVICE. The access number, ACN, maybe presented to the user in a classical graphical form, or by its graphical equivalents, or by means of electromagnetic waves. The user, USER, dials the access number, ACN, in his/her mobile device and connects to the server, HOST: via a communications network to a terminal device, DT, or via a TCP/IP network directly to the server, HOST. The server, HOST, receives, 104, information about an incoming call from the user, USER, and performs a basic authentication, 105, including at least a verification of the validity of the access number, ACN, and of the MSISDN number of the user, USER. The result of the basic authentication is transferred, 106, by the server HOST to the service, SERVICE. If the obtained, 101, request to authenticate contained the MSISDN of the user, USER, then the transfer, 106, of the result of the basic authentication is executed after the server, HOST, verifies, within the basic authentication, 105, the MSISDN number included in the request from the service, SERVICE. Preferably, the basic authentication, 105, includes an additional verification of the user, USER, basing on his/her individual profile containing at least one of: biometric features, an alphanumeric password, a numeric code, or a digital identifier. The individual profile of the user, USER, is verified in the server, HOST, by means of one of: tone dialing DTMF, an SMS message, a USSD message, speech recognition, electromagnetic waves, graphical message, or a video message. Preferably, during performing the basic authentication, 105, the server, HOST, sends an additional information to the user, USER, authenticating the server, HOST. Preferably, along with transferring, 106, by the server, HOST, the result of the basic authentication to the service, SERVICE, also the call coming from the mobile device of the user, USER, is forwarded to the service, SERVICE. Preferably, the receiving, 104, by the server, HOST, the information containing the access number, ACN, and the MSISDN number of the user, USER, is executed via a TCP/IP packet network directly from the telephone of the user, USER. In this case, the basic authentication, 105, is, preferably, performed in the mobile device. The access number, ACN, may be a number from outside the commonly available numbering range in a public communications network. The access number, ACN, may be transferred in form of digits, using graphical codes, or electromagnetic waves. Also, information about the form of the access number, ACN, may be contained in the request, received, 101, by the server, HOST, and then, the number is assigned, 102, by the server, HOST, taking this information into consideration.

Figure 2:
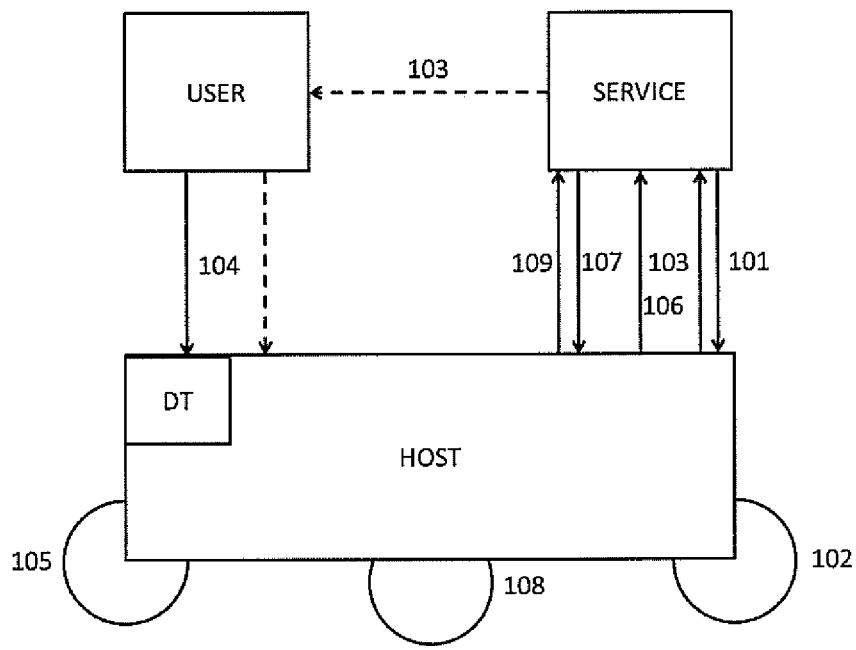
FIG. 2 illustrates a method for authenticating, in a second embodiment.
Figure 5:
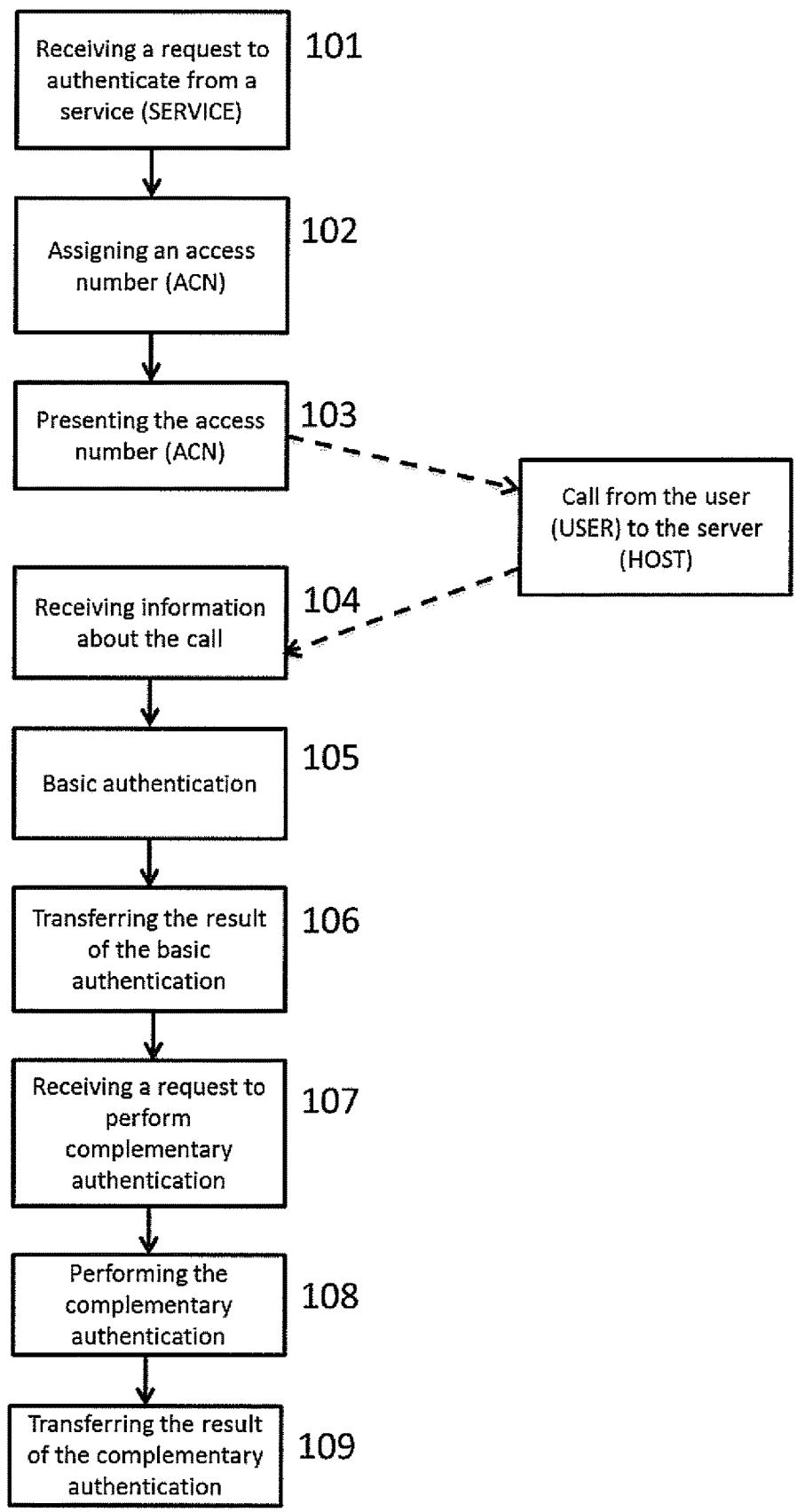
FIG. 5 illustrates a method for authenticating, in a second embodiment.

According to the present invention, illustrated in FIGS. 2 and 5, a server, HOST, receives, 101, from a service, SERVICE, a request to authenticate a user, USER. Preferably, this request may contain an MSISDN number of the user, USER. The server, HOST, assigns, 102, to this request, an access number, ACN, that, subsequently, is presented, 103, to the user, USER, via the service, SERVICE. The access number, ACN, maybe presented to the user in a classical graphical form, or by its graphical equivalents, or by means of electromagnetic waves. The user, USER, dials the access number, ACN, in his/her mobile device and connects to the server, HOST, or via a communications network to a terminal device, DT, or via a TCP/IP network directly to the server, HOST. The server, HOST, receives, 104, information about an incoming call from the user, USER, and performs a basic authentication, 105, including at least a verification of the validity of the access number, ACN, and of the MSISDN number of the user, USER. The result of the basic authentication is transferred, 106, by the server HOST to the service, SERVICE. If the obtained, 101, request to authenticate contained the MSISDN of the user, USER, then the transfer, 106, of the result of the basic authentication is executed after the server, HOST, verifies, within the basic authentication, 105, the MSISDN number transferred by the service, SERVICE. After transferring, 106, the result of the basic authentication, the server, HOST, receives, 107, from the service, SERVICE, a request to perform a complementary authentication of the user, USER, the result of which, after performing it, 108, the server, HOST, transfers back, 109, to the service, SERVICE. Preferably, the basic authentication, 105, and the complementary authentication, 108, include additional identification of the user, USER, basing on his/her individual profile comprising at least one of: biometric features, an alphanumeric password, a numeric code, or a digital identifier. The individual profile of the user, USER, is verified on the server, HOST, by means of one of: tone dialing DTMF, an SMS message, a USSD message, speech recognition, electromagnetic waves, graphical message, or a video message. Preferably, during performing the selected authentication type, the server, HOST, sends to the user, USER, additional information authenticating the server, HOST, itself. Preferably, along with transferring, 109, the result of the complementary authentication from the server, HOST, to the service, SERVICE, also the call, that is incoming from the mobile device of the user, USER, is forwarded to the service, SERVICE. Preferably, the reception, 104, by the server HOST, of the information containing the access number, ACN, and the MSISDN number of the user, USER, may be performed also by means of the TCP/IP network directly from the phone of the user, USER. In this case, the basic authentication, 105, is performed advantageously in the mobile device. The access number, ACN, may be a number from outside the commonly available numbering range in a public communications network. The access number, ACN, may be transferred in form of digits, using graphical codes, or electromagnetic waves. Also, information about the form of the access number, ACN, may be contained in the request, received, 101, by the server, HOST, and then, the number is assigned, 102, by the server, HOST, taking this information into consideration.

Figure 3:
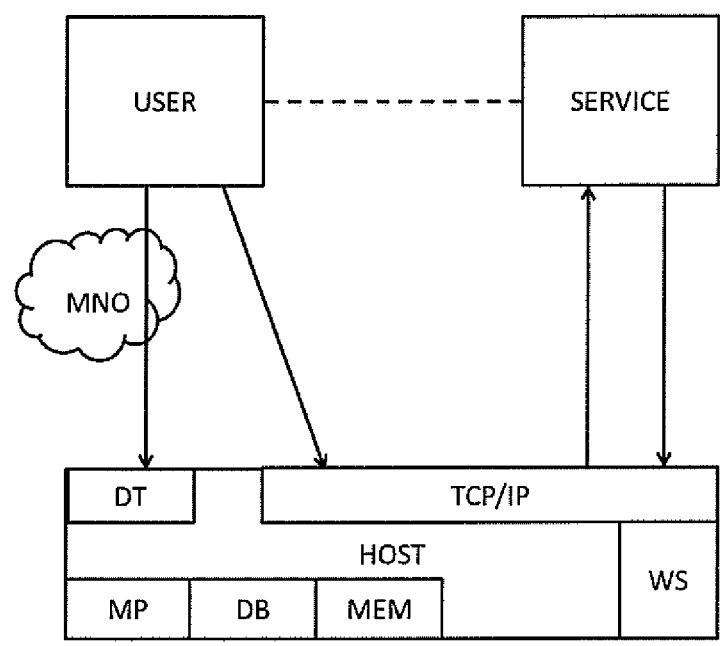
FIG. 3 illustrates an authentication server.

FIG. 3 illustrates a server, HOST, authenticating a user, USER, by means of a mobile device. The server, HOST, is composed of cooperating Information Technology components, comprising at least: a terminal device, DT, connected to a communications network and making it possible to receive communications calls; a microprocessor system, MP, enabling to activate a software application, to process data and to communicate with the terminal device, DT, and a TCP/IP network interface; a TCP/IP network interface enabling to communicate with a service, SERVICE, and directly to mobile devices of the users, USER, a database, DB, for storing and processing information; a memory, MEM, for storing the database, DB, a server application, WS, and data; a server application, WS, enabling to process data and to exchange information with the service, SERVICE, and mobile device of the user, USER. The microprocessor system, MP, while executing the server application, WS, is adapted for receiving, from the service, SERVICE, requests to authenticate users, USER, and assigning access numbers, ACN, answering communications calls coming to the terminal device, DT, exchanging information with mobile devices working within a TCP/IP network, performing the basic authentication, in particular, verifying the validity of the access numbers, ACN, and MSISDN numbers and the validity of pairing thereof, transferring the results of the authentication to the service, SERVICE.

The server may be composed of a single element, integrating the above described functions, as well as of separated elements, performing different functions, that are appropriately arranged. Preferably, the server, HOST, is adapted for performing a complementary authentication and transferring the result of this complementary authentication to the service, SERVICE. Preferably, the server, HOST, is adapted for verifying the user, USER, basing on an individual profile of the user, USER, containing at least one of: biometric features, an alphanumeric password, a PIN code, or a digital identifier. Additionally, the server, HOST, is adapted for performing the authentication in the server itself or in the mobile device of the user, USER. Preferably, the terminal device, DT, makes it possible to state contact points with mobile telephony networks, MNO.

The above solution makes it possible to authenticate, in simple and safe manner, users using feature mobile phones as well as smartphones that can run application software (apps) and have Internet connectivity. It is a fully versatile solution, making it possible to use any type of a phone or a mobile device available in the market. The innovation of the present invention is that for authenticating a user, access number, ACN, are assigned by a server, HOST, for every user (every session), the access numbers, ACN, having a form of communication numbers, this, along with the user's MSISDN number allowing for his/her unambiguous identification. Using, additionally, user profiles in the authentication process, makes it possible to perform full user authentication. The additional benefit from the invention is that the authentication may be performed basing on the standard infrastructure of the telecommunications network, complemented by a dedicated server, whereby this solution may be used for a level of any mobile phone present in the market and in any network. Such solution is cheaper, more versatile and simpler than competing state of the art solutions present in the market now.

Example 1

According to a method of the invention, illustrated in FIGS. 1 and 4, a user, USER, wishes to log in to a web page of a social networking service. The social service is the service, SERVICE, in the context of the present invention, and the user, USER, wishes to log in by means of his/her mobile phone identified by an MSISDN number. The server, HOST, receives, 101, a request, from the service, SERVICE, to authenticate the user, USER. The server, HOST, assigns, 102, to the request, an access number, ACN, that is displayed, 103, to the user, USER, on the web page of the social networking service. The user, USER, makes, 104, a call from his/her phone to the access number, ACN, the call being delivered to the server, HOST, by means of a telephone switchboard, DT, integrated therewith. The server, HOST, within the basic authentication, 105, verifies if the access number, ACN, was active and to which social networking service, SERVICE, was it assigned, and verifies the validity of the MSISDN number of the user, USER. Next, it sends, 106, to the social networking service, SERVICE, the result of the authentication, including the information about the MSISDN number of the user, USER.

Example 2

In FIGS. 2 and 5, a user, USER, wishes to log in to a web page of a social networking service. The social service is the service, SERVICE, in the context of the present invention, and the user, USER, wishes to log in by means of his/her mobile phone identified by an MSISDN number. The server, HOST, receives, 101, a request, from the service, SERVICE, to authenticate the user, USER. The server, HOST, assigns, 102, to the request, an access number, ACN, that is displayed, 103, to the user, USER, on the web page of the social networking service. The user, USER, makes, 104, a call from his/her phone to the access number, ACN, the call being received by an IVR system, DT, integrated with the server, HOST. The server, HOST, within the basic authentication, 105, verifies if the access number, ACN, was active and to which service was it assigned, and verifies the validity of the MSISDN number of the user, USER. Next, it sends, 106, to service, SERVICE, the information about the MSISDN number of the user, USER. The service, SERVICE, checks, in its database, if a user, USER, having such MSISDN number exists and what is his/her PIN code, and then, it transfers, 107, this code to the server, HOST, requesting to perform complementary authentication. The server, HOST, by means of the IVR system, DT, performs the complementary authentication by asking the user, USER, for his/her PIN code. The result of this authentication is transferred, 109, back to the service, SERVICE, and the voice call is disconnected.

Example 3

In a method illustrated in FIGS. 1 and 4, a user, USER, wishes to check his/her account balance in a VOD (video on demand) service. The VOD service is a service, SERVICE, and the user, USER, is using a smartphone identified by an MSISDN number. The server, HOST, receives, 101, a request, from the VOD service, SERVICE, to authenticate the user, USER. The server, HOST, assigns, 102, to the request, an access number, ACN, that is displayed, 103, to the user, USER, on the web page of service, SERVICE, in the form of two-dimensional QR code. The user, USER, by means of a selected application supporting QR codes, scans the presented code, as a result of which a call is performed, 104, to the access number, ACN, the call being delivered to a switchboard, DT, integrated with the server. The server, HOST, within the basic authentication, 105, recognizes and verifies the MSISDN telephone number of the user, USER, along with the access number, ACN. The server, HOST, transfers, 106, the user's MSISDN number to the service. The incoming call is rejected, while the service, basing on the information about the MSISDN number of the user, USER, displays his/her account balance in the system.

Example 4

An embodiment shown in FIGS. 1 and 4 is used for authorizing a bank remittance ordered by a user, USER. In this Example, a bank plays the role of service, SERVICE.

A server, HOST, receives, 101, a request, from the bank, SERVICE, to authenticate a user, containing his/her MSISDN phone number. The server, HOST, assigns, 102, an access number, ACN, and displays, 103, it to the user, USER, via the bank, SERVICE, web page. The user, USER, using his/her mobile phone, calls the access number, ACN. The server, HOST, by means of an integrated IVR system, DT, receives, 104, the incoming call, and, within the basic authentication, 105, verifies, if the call to the specified access number, ACN, has come from the MSISDN number indicated by the bank, SERVICE. If the call is coming from another MSISDN number, the server, HOST, rejects it, whereas if the MSISDN number of the incoming call matches the MSISDN number indicated by the bank, SERVICE, the information about the MSISDN number is transferred, 106, to the bank, SERVICE.

Example 5

FIGS. 1 and 4 illustrate an embodiment similar to Example 4. A server, HOST, receives, 101, a request from a bank, SERVICE, to authenticate a user, USER, containing his/her MSISDN phone number and, additionally a PIN code. The server, HOST, assigns, 102, an access number, ACN, and displays, 103, it to the user, USER, via the bank, SERVICE, web page. The user, USER, using his/her mobile phone, calls the access number, ACN. The server, HOST, by means of an integrated IVR system, DT, within the basic authentication, 105, verifies, if the call has come to the specified access number, ACN, from the MSISDN number indicated by the bank, SERVICE. If yes, then the call is received, 104, and the user, USER, is asked to enter a PIN code by tone dialing (DTMF). After entering a valid PIN code, the voice call is disconnected and the result of the authentication, along with the MSISDN number of the user, USER, is transferred, 106, by the server, HOST, to the bank, SERVICE. If the authentication failed, the server HOST transfers, 106, to the bank, SERVICE, the MSISDN number of the user, USER, together with a relevant message.

Example 6

Example 6 is analogous to Example 5, except that after receiving a voice call by the IVR system, a sequence of sounds is played to the user, USER, known only to him/her, that authenticates the server, HOST. Moreover, the PIN code, instead of DTMF signals, is sounded by the user, USER, and the verification thereof, within the basic authentication, is performed in the server, HOST, by means of a speech recognition software application.

Example 7

FIGS. 1 and 4 illustrate also a service used for authenticating a user, USER, when contacting an official using voice biometry. The service, SERVICE, is a software application in a computer of an official. Furthermore, a server, HOST, has an access to a database of biometrics profiles of users, USER. The server, HOST, receives, 101, from a software application, SERVICE, a request to authenticate a user, USER, having a MSISDN phone number. The server, HOST, assigns, 102, an access number, ACN, and sends, 103, an SMS message containing the access number, ACN, to the user to the MSISDN number. The user, USER, makes a call to the received access number, ACN, the call being received, 104, by an IVR system, DT, integrated with the server, HOST, and equipped with the functionality of voice biometry. The server, HOST, verifies, within the basic authentication, 105, if the call to the access number, ACN, comes from the MSISDN number of the user, USER, indicated by the software application. If yes, the call is answered, 104, and the user, USER, is asked to say a sequence of words, basing on which his/her biometric profile is verified. The result of the verification, along with the MSISDN number of the user, USER, is transferred, 106, by the server, HOST, to the software application, SERVICE, in the official's computer.

Example 8

According to the next embodiment illustrated in FIGS. 1 and 4, a user, USER, has a software application installed on a phone with a proximity functionality and a fingerprint reader, cooperating with a server, HOST, the user, USER, wants to use for checking his/her account balance at an energy provider. The operation of checking the account balance is performed in a standalone information kiosk made freely available by the energy provider, the kiosk acting as a service, SERVICE. The kiosk is provided with an interface of a proximity reader. To check the account balance, the user, USER, brings his/her phone near the proximity reader in the kiosk, SERVICE, that sends, 101, to the server, HOST, a request to authenticate the user, USER. The server, HOST, assigns, 102, an access number, ACN, that is presented, 103, via the proximity reader of the kiosk, to the software application in the telephone of the user, USER, that by means of a TCP/IP network connects, 104, to the server, HOST, and transfers, to the server, the access number, ACN, along with the MSISDN number of the user, USER. The server, HOST, after performing the basic authentication, 105, transfers, 106, the MSISDN number to the kiosk, SERVICE, that sends information about the balance of the account of the user, USER, to the software application in the phone of the user, USER.

Example 9

According to another embodiment illustrated in FIGS. 2 and 5, a user, USER, using a telephone with a fingerprint reader, is going to settle some matters in an office. The user, USER, takes his/her application number from a terminal servicing the queue/sequence of applicants. The terminal, integrated with a software application, SERVICE, on the office servers, sends a request, 101, to a server, HOST, to authenticate the user, USER. The server, HOST, assigns, 102, an access number, ACN, and, by means of the software application, SERVICE, and the integrated therewith terminal, prints the access number, ACN, on a receipt. In a display, in the office, access numbers, ACN, are displayed sequentially along with numbers of stands/desks at which users, USER, will be served having the corresponding numbers. After displaying the access number, ACN, to the user, USER, he/she comes to the indicated stand/desk and calls, with his/her phone, the access number, ACN. The call is delivered to the server, HOST, by means an IVR system, DT, integrated therewith, and, after the initial authentication, 105, the information about the MSISDN number of the user, USER, is transferred, 106, via a TCP/IP network, to the software application, SERVICE, in the office. The software application, SERVICE, verifies the profile of the user, USER, in its databases, and sends, 107, to the server, HOST, a request for complementary authentication of the user, USER, basing on his/her biometric profile. The server, HOST, in cooperation with the software application in the mobile device of the user, USER, performs, 108, the complementary authentication by verifying fingerprints and sends, 109, the result to the software application, SERVICE, in the office.

Example 10

According to another embodiment presented in FIGS. 1 and 4, a user, USER, is going to settle some matters in an office. To this end, he/she comes to a terminal servicing the queue/sequence of applicants, integrated with the information system, SERVICE, of the office. A server, HOST, receives, 101, from the information system, SERVICE, of the office, a request to authenticate the user, USER. An access number, ACN, assigned, 102, by the server, HOST, is presented, 103, by means of the information system of the office, to the terminal servicing the queue, and displayed to the user, USER. The user, USER, makes a telephone call from his/her mobile phone, received, 104, by the server, HOST, by means of a built-in card, DT, for communicating a communications network. Within the basic authentication, 105, the server, HOST, verifies the access number, ACN, and the MSISDN number of the user, USER, and sends, 106, this number to the information system, SERVICE, of the office and then to the terminal servicing the queue that sends an SMS to the user's phone, the SMS containing the access number, ACN. The information about the number of the stand/desk at which the user with the given access number, ACN, will be served, is displayed on the screen in the office. At the moment the user, USER, is to be served, the information system of the office sends, 107, to the server, HOST, a request to perform complementary authentication by a PIN code in the USSD technology. Additionally, this request contains the number of the stand/desk at which the user will be served. The relevant USSD message, containing the number of the stand/desk along with the request to enter a PIN code, is sent by the server, HOST, to the phone of the user, USER. Answering, the user, USER, enters his/her PIN code and comes to the indicated stand/desk. After performing, 108, the complementary authentication, its result together with the MSISDN number of the user, USER, is sent, 109, to the information system, SERVICE, of the office, which, basing on this, displays the profile of the user, USER, on the official's computer.

The invention claimed is:

1. A method for authenticating a user by means of a mobile device, comprising:
   Receiving, by a server (HOST) from a service (SERVICE), a request to authenticate a user (USER),
   Assigning an access number (ACN) by the server (HOST),
   Presenting the access number (ACN) from the server (HOST) to the user (USER) via the service (SERVICE),
   Receiving, by the server (HOST) by means of a terminal device (DT) that services the access number (ACN), information about a call performed by the user (USER) to the access number (ACN), the information containing at least the access number (ACN) and a MSISDN number of the user (USER),
   Performing, by the server (HOST), a basic authentication of the user (USER), comprising at least reading the MSISDN number of the user (USER) and the access number (ACN),
   Transferring the result of the basic authentication from the server (HOST) to the service (SERVICE).

2. A method according to claim 1, wherein the request received by the server (HOST) from the service (SERVICE) contains the MSISDN number of the user (USER), and the transfer of result of the basic authentication from the server (HOST) to the service (SERVICE) is performed after the server (HOST) verifies, within the basic authentication, the MSISDN number indicated by the service (SERVICE).

3. A method according to claim 1, wherein after transferring, by the server (HOST), the result of the basic authentication to the service (SERVICE), the server (HOST) receives, from the service (SERVICE), a request to perform a complementary authentication of the user (USER), and then, after performing the complementary authentication, the result of the complementary authentication is transferred from the server (HOST) to the service (SERVICE).

4. A method according to claim 1, wherein the authentication is an additional verification of the user (USER) basing on his/her individual profile comprising at least one of: biometric features, an alphanumeric password, a numeric code, or a digital identifier.

5. A method according to claim 4, wherein the individual profile of the user (USER) is verified in the server (HOST) by means of one of: tone dialing DTMF, an SMS message, a USSD message, speech recognition, electromagnetic waves, graphical message, or a video message.

6. A method according to claim 4 wherein, when performing the authentication, the server (HOST) transfers additional information to the user (USER), authenticating the server (HOST) itself.

7. A method according to claim 1, wherein along with transferring the result of the authentication from the server (HOST) to the service (SERVICE), also the call is forwarded to the service (SERVICE) that is incoming from the mobile device of the user (USER).

8. A method according to claim 1, wherein the reception, by the server (HOST), of the information containing the access number (ACN) and the MSISDN number of the user (USER), may be performed by means of the TCP/IP network directly from a phone of the user (USER).

9. A method according to claim 1, wherein the access number (ACN) is a number from outside the commonly available numbering range in a public communications network.

10. A method according to claim 1, wherein the access number (ACN) may be transferred in the form of digits, graphical codes or electromagnetic waves.

11. A method according to claim 1, wherein the request received by the server (HOST) contains also information about the form of the access number (ACN), and the access number (ACN) is assigned by the server (HOST) taking this information into consideration.

12. A method according to claim 1, wherein the request contains an expected MSISDN number of the user (USER), the server (HOST) performs the basic authentication including at least a verification of validity of the access number (ACN) and of the MSISDN number of the user (USER) and the basic authentication is transferred by the server (HOST) to the service (SERVICE).

13. A method according to claim 12, wherein server (HOST) within the basic authentication, verifies if the access number (ACN) was active and to which service (SERVICE), was it assigned, and after verifying the validity of the MSISDN number of the user (USER) sends to the service (SERVICE) a result of the basic authentication, including the information about the MSISDN number of the user (USER).

14. A method according to claim 1, wherein the receiving includes receiving by the server (HOST) a database check from the service (SERVICE) that the MSISDN number of the user (USER) exists and further receiving a user (USER) code.

15. A method according to claim 1, further comprising receiving by the server (HOST) from the service (SERVICE) a request to perform a complementary authentication and performing by the server (HOST) the complementary authentication by asking the user (USER) for the code and transferring a result of authentication back to the service (SERVICE) for disconnection of the user.

16. A server (HOST) authenticating a user (USER) by means of a mobile device, comprising:
   A terminal device (DT) making it possible to receive communications calls,
   A microprocessor system (MP) enabling to activate a software application, to process data and to communicate with the terminal device (DT) and a TCP/IP network interface,
   A TCP/IP network interface,
   A database (DB) for storing and processing information about access numbers (ACN), MSISDN numbers of the users (USER), their individual profiles, and configuration and profiles of services (SERVICE),
   A server application (WS) enabling to exchange information with the service (SERVICE) and the mobile device of the user (USER),
   A memory (MEM) for storing the database (DB), the server application (WS), and for processing data,
   the microprocessor system (MP), while executing the server application (WS), performing:
   receiving, by the server (HOST) from the service (SERVICE), a request to authenticate a user (USER),
   assigning, by the server (HOST), an access number (ACN),
   transferring, by the server (HOST), the access number (ACN) to the user (USER) via the service (SERVICE),
   receiving, by the server (HOST) by means of the terminal device (DT) that services the access number (ACN), information about the call performed by the user (USER) to the access number (ACN), the information containing at least the access number (ACN) and the MSISDN number of the user (USER), performing, by the server (HOST), a basic authentication of the user (USER), comprising at least reading the MSISDN number of the user (USER) and the access number (ACN), transferring the result of the basic authentication from the server (HOST) to the service (SERVICE).

17. A server (HOST) according to claim 16, wherein the microprocessor system (MP), while executing the server application (WS), is adapted for performing a complementary authentication and transferring the result of the complementary authentication to the service (SERVICE).

18. A server (HOST) according to claim 16, wherein the microprocessor system (MP), while performing the authentication procedure, is adapted for identifying the user (USER) basing on an individual profile of the user (USER), containing at least one of: biometric features, an alphanumeric password, a PIN code, or a digital identifier.

19. A server (HOST) according to claim 16, wherein the terminal device (DT) makes it possible to state contact points with mobile telephony networks (MNO).

* * * * *